(12) United States Patent
Uchida et al.

(10) Patent No.: US 10,371,890 B2
(45) Date of Patent: Aug. 6, 2019

(54) OPTICAL WAVEGUIDE ELEMENT

(71) Applicant: FURUKAWA ELECTRIC CO., LTD., Tokyo (JP)

(72) Inventors: Yasuyoshi Uchida, Tokyo (JP); Yuuki Taniguchi, Tokyo (JP); Hiroshi Kawashima, Tokyo (JP); Kazutaka Nara, Tokyo (JP); Masanori Takahashi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 117 days.

(21) Appl. No.: 15/145,482

(22) Filed: May 3, 2016

(65) Prior Publication Data

US 2016/0246001 A1    Aug. 25, 2016

Related U.S. Application Data

(63) Continuation-in-part of application No. 14/189,127, filed on Feb. 25, 2014, now Pat. No. 9,354,395.

(30) Foreign Application Priority Data

Feb. 26, 2013    (JP) .................... 2013-036406

(51) Int. Cl.
  *G02B 6/02* (2006.01)
  *G02B 6/10* (2006.01)
  (Continued)

(52) U.S. Cl.
  CPC ........ *G02B 6/12011* (2013.01); *C03C 14/004* (2013.01); *G02B 6/122* (2013.01);
  (Continued)

(58) Field of Classification Search
  CPC .......... G02B 6/136; G02B 2006/12038; G02B 6/12169
  (Continued)

(56) References Cited

U.S. PATENT DOCUMENTS 5,117,470 A    5/1992  Inoue et al.
5,303,319 A    4/1994  Ford et al.
(Continued)

FOREIGN PATENT DOCUMENTS

JP    1-189614 A    7/1989
JP    5-294675 A    11/1993
(Continued)

OTHER PUBLICATIONS

Office Action dated Oct. 4, 2016 in Japanese Patent Application No. 2013-036406.
(Continued)

*Primary Examiner* — Kaveh C Kianni
*Assistant Examiner* — Hung Q Lam
(74) *Attorney, Agent, or Firm* — Oblon, McClelland, Maier & Neustadt, L.L.P.

(57) ABSTRACT

An optical waveguide element includes: a cladding portion made of silica-based glass; and a plurality of optical waveguides positioned in the cladding portion and made of silica-based glass in which $ZrO_2$ crystal particles are dispersed. The optical waveguide element is a planar lightwave circuit. The plurality of optical waveguides configure an arrayed waveguide grating element.

3 Claims, 16 Drawing Sheets

(51) Int. Cl.
  *G02B 6/12* (2006.01)
  *G02B 6/14* (2006.01)
  *G02B 6/293* (2006.01)
  *G02B 6/28* (2006.01)
  *G02B 6/27* (2006.01)
  *C03C 14/00* (2006.01)
  *G02B 6/122* (2006.01)
  *G02B 6/136* (2006.01)

(52) U.S. Cl.
  CPC ......... *G02B 6/12016* (2013.01); *G02B 6/136* (2013.01); *G02B 6/14* (2013.01); *G02B 6/2773* (2013.01); *G02B 6/2808* (2013.01); *G02B 6/29338* (2013.01); *G02B 2006/121* (2013.01)

(58) Field of Classification Search
  USPC .................. 385/123, 129–132, 141, 142, 144
  See application file for complete search history.

(56) References Cited

U.S. PATENT DOCUMENTS

| | | |
|---|---|---|
| 2002/0154878 A1 | 10/2002 | Akwani et al. |
| 2003/0232200 A1* | 12/2003 | Bryan .................. B32B 9/04 428/446 |
| 2004/0105644 A1* | 6/2004 | Dawes .................. G02B 6/122 385/129 |
| 2009/0052856 A1 | 2/2009 | Bae et al. |
| 2010/0104254 A1* | 4/2010 | Hirayama ............... C08L 83/04 385/141 |
| 2012/0261625 A1 | 10/2012 | Chiu et al. |
| 2014/0212102 A1 | 7/2014 | Hoover et al. |

FOREIGN PATENT DOCUMENTS

| | | |
|---|---|---|
| JP | 9-133824 A | 5/1997 |
| JP | 10-148726 A | 6/1998 |
| JP | 2001-51145 A | 2/2001 |
| JP | 2003-20254 A | 1/2003 |
| JP | 2005-121696 A | 5/2005 |
| JP | 2005-531030 | 10/2005 |
| WO | WO 2004/001463 A1 | 12/2003 |

OTHER PUBLICATIONS

R. Sara, et al., "Photolithography Fabrication of Sol-Gel Ridge Waveguide", SPIE, Part of the SPIE Conference on Organic-Inorganic Hybrid Materials for Photonics, Jul. 1998, vol. 3469, pp. 118-123.

S. Iraj Najafi, et al., "Sol-Gel Glass Waveguide and Grating on Silicon", Journal of Lightwave Technology, vol. 16, No. 9, Sep. 1998, 7 pages.

* cited by examiner

OPTICAL WAVEGUIDE ELEMENT

CROSS REFERENCES TO RELATED APPLICATIONS

This application is a continuation-in-part application of U.S. patent application Ser. No. 14/189,127 filed on Feb. 25, 2014, which claims the benefit of priority from the prior Japanese Patent Application No. 2013-036406, filed on Feb. 26, 2013; the entire contents of which are incorporated herein by reference.

BACKGROUND

1. Field of Invention

The present invention relates to an optical waveguide element.

2. Explanation of Related Art

A technology is disclosed that uses zirconia ($ZrO_2$) as a dopant increasing a refractive index of an optical waveguide constituting a Planar Lightwave Circuit (PLC) element made of a silica-based glass (see Japanese Translation of PCT International Application Publication No. 2005-531030). $ZrO_2$ is a material having a refractive index higher than that of Germania ($GeO_2$) and a thermal expansion coefficient smaller than that of $GeO_2$. For that reason, $ZrO_2$ is expected to be a material that enables a PLC component or the like to be downsized and is capable of reducing a stress residing in a waveguide.

Conventionally, a technology is disclosed by which an optical waveguide containing $ZrO_2$ is formed by using sol-gel method (see R. Sara et al. "Photolithography Fabrication of Sol-Gel Ridge Waveguide" SPIE vol. 3469 p. 118-123(1998), and S. Iraj et al. "Sol-Gel Glass Waveguide and Grating on Silicon" J. LIGHTWAVE TECH. VOL.16, NO.9, (1998) (hereinafter called Reference Literatures 1 and 2)).

SUMMARY OF INVENTION

It is an object of the present invention to at least partially solve the problem in the conventional technology.

An optical waveguide element according to an aspect of the present invention includes a cladding portion made of silica-based glass; and a plurality of optical waveguides positioned in the cladding portion and made of silica-based glass in which $ZrO_2$ crystal particles are dispersed. The optical waveguide element is a planar lightwave circuit. The plurality of optical waveguides configure an arrayed waveguide grating element.

An optical waveguide element according to still another aspect of the present invention includes a cladding portion made of silica-based glass; and a plurality of optical waveguides positioned in the cladding portion and made of silica-based glass in which $ZrO_2$ crystal particles are dispersed. The optical waveguide element is a planar lightwave circuit. The plurality of optical waveguides configure a ring resonator.

An optical waveguide element according to still another aspect of the present invention includes a cladding portion made of silica-based glass; and a plurality of optical waveguides positioned in the cladding portion and made of silica-based glass in which $ZrO_2$ crystal particles are dispersed. The optical waveguide element is a planar lightwave circuit. The plurality of optical waveguides configure a coherent mixer.

The above and other features, advantages and technical and industrial significance of this invention will be better understood by reading the following detailed description of presently preferred embodiments of the invention, when considered in connection with the accompanying drawings.

DETAILED EXPLANATION OF PREFERABLE EMBODIMENTS

Figure 1:
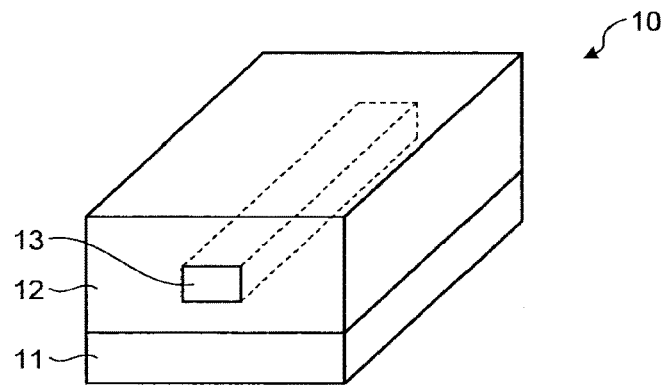
FIG. 1 is a schematic perspective view of an optical waveguide element according to an embodiment.

Hereinafter, embodiments of an optical waveguide element according to the present invention will be described in detail with reference to the accompanying drawings. It should be noted that the present invention is not limited by the embodiments and can be modified in various ways without departing from the spirit of the present invention. In the drawings, if deemed appropriate, identical or equivalent elements are given same reference numerals. The drawings are schematic depictions, and do not represent the actual relation between a width and a thickness of each element and ratios of each element. Different drawings may include portions using different scales and dimensional relations.

$ZrO_2$ is known as a material which is difficult to be etched. For example, the etching rate of $ZrO_2$ is slow for a fluorine-based etchant used in an ordinary process of fabricating a silica-based glass-based PLC element. As a result, there is a problem that a conventional optical waveguide element using $ZrO_2$ is costly because the optical waveguide element is low in processability and thus time-consuming for producing.

In contrast, embodiments hereinafter described can realize a small-size and low-cost optical waveguide element.

FIG. 1 is a schematic perspective view of an optical waveguide element according to an embodiment. As illustrated in FIG. 1, an optical waveguide element 10 includes a cladding portion 12 made of a silica-based glass and formed on a substrate 11 such as a silicon or a silica glass, and an optical waveguide 13 positioned in the cladding portion 12.

The optical waveguide element 10 can be used as an element constituting, for example, an waveguide type optical interferometer such as a Mach-Zehnder Interferometer (MZI) or a demodulation element for demodulating a D(Q)PSK optical signal in a communication scheme such as a Differential Quadrature Phase Shift Keying (DQPSK) or Differential Phase Shift Keying (DPSK).

The optical waveguide 13 is made of a silica-based glass containing $ZrO_2$ that is a dopant increasing a refractive index. Since a refractive index of the optical waveguide 13 is higher than that of the cladding portion 12, the optical waveguide 13 serves as an optical waveguide that confines and guides a light therein. A relative refractive-index difference of the optical waveguide 13 relative to the cladding portion 12 is, for example, 5% to 10%, and a cross section is 3.0 μm×3.0 μm to 2.5 μm×2.5 μm to 1.5 μm×1.5 μm in size. The cross section of the optical waveguide 13 is basically a square in shape, but may be a rectangle in shape.

Since the optical waveguide 13 contains $ZrO_2$, the refractive index of the optical waveguide 13 can be higher than that in case of using $GeO_2$ as a dopant increasing the refractive index. The relative refractive-index difference of the optical waveguide 13 relative to the cladding portion 12 can be, for example, 1.5% to 30% by adjusting the amount of $ZrO_2$ contained in the optical waveguide 13. In contrast, the relative refractive-index difference of the optical waveguide using $GeO_2$ is generally lower than 1.5% or approximately 2.5% at maximum. Therefore, a waveguide length that is necessary for producing a desirable optical interference when using the optical waveguide element 10 for an element constituting an optical interference element or the like becomes shorter in proportion to a degree of refractive index. This results in downsizing of the optical waveguide element 10.

$ZrO_2$ contained in the optical waveguide 13 is mostly dispersed in a state of particles. A particle size of $ZrO_2$ is equal to or smaller than 100 nm, and an average distance between $ZrO_2$ particles is equal to or larger than 100 nm. Since this results in suppressing the $ZrO_2$ particles in the optical waveguide 13 from dispersing a light input into the optical waveguide 13, thereby preferably suppressing an increase in a waveguide optical loss of the optical waveguide element 10. It is preferable that the average distance between $ZrO_2$ particles is equal to or smaller than the wavelength of a light input into the optical waveguide 13. If the average distance between $ZrO_2$ particles is too large, a fluctuation occurs because a refractive index differs depending on the place. If the refractive index fluctuates, a Rayleigh scattering occurs, and thereby a waveguide optical loss of the optical waveguide element 10 may increase.

The particle size herein is a value obtained by using Scherrer's Equation from an X-ray diffraction pattern, for example. The average distance between particles is a value obtained by observation using a TEM.

In the present specification, "$ZrO_2$ particle" means a $ZrO_2$ crystalline particle or a $ZrO_2$ non-crystalline particle.

A wavelength of a light to be input is not limited specifically. For example, in case where the optical waveguide element 10 is an element to be used for a light at 1.5 μm wavelength band (approximately 1.5 μm to 1.62 μm), which is a communication wavelength band, it is preferable that an average distance between $ZrO_2$ particles is equal to or smaller than 1.62 μm that is the upper limit of the wavelength band. In case of using another wavelength band of a light at which the optical waveguide element 10 is used, for example, 1.3 μm wavelength band (approximately 1.26 μm to 1.36 μm), 1.0 μm wavelength band (approximately 1.0 μm to 1.1 μm), or 0.8 μm wavelength band (approximately 0.79 μm to 0.83 μm), it is preferable that an average distance between $ZrO_2$ particles is equal to or smaller than the upper limit of each wavelength band.

Since a thermal expansion coefficient of $ZrO_2$ is small, a residual stress produced in the optical waveguide 13 is small even if temperature varies in a production process or an environment temperature varies. As a result, an increase in the waveguide optical loss of the optical waveguide element 10 is preferably suppressed and a decrease in reliability is preferably prevented.

The optical waveguide 13, which contains a $ZrO_2$ particle, is high in processability in an etching step as described later and can be produced within a shorter time than a conventional one. As a result, the optical waveguide element 10 can be produced at a low cost.

Figure 2:
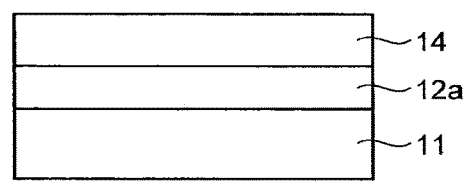
FIG. 2 is a drawing explaining an example of a method for producing the optical waveguide element illustrated in FIG. 1.

An example of a method of producing the optical waveguide element 10 illustrated in FIG. 1 will be explained. As illustrated in FIG. 2, a lower cladding layer 12a made of a silica-based glass is first formed on a substrate 11 by using, for example, plasma CVD (Chemical Vapor Deposition) method, and then annealed to be transparently vitrified. The optical-waveguide-forming layer 14 for forming an optical waveguide on the lower cladding layer 12a is then formed by a sputtering method using an $SiO_2$ target and a $ZrO_2$ target both of which are unary targets. A binary target made of a mixture of $SiO_2$ and $ZrO_2$ may be used. The opticalwaveguide-forming layer 14 thus formed is considered to be in an amorphous state in which $SiO_2$ and $ZrO_2$ form a network.

Figure 3:
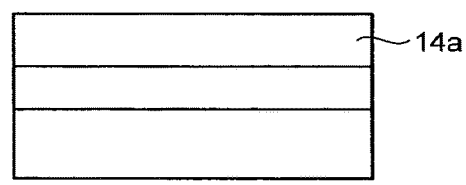
FIG. 3 is a drawing explaining an example of a method for producing the optical waveguide element illustrated in FIG. 1.

After that, as illustrated in FIG. 3, the optical-waveguide-forming layer 14 is heat-treated. The optical-waveguide-forming layer 14 is hereby annealed to precipitate and form a $ZrO_2$ crystalline particle, and becomes an optical-waveguide-forming layer 14a. The $ZrO_2$ crystalline particles thus formed are dispersed in the optical-waveguide-forming layer 14a almost uniformly. The particle size of the $ZrO_2$ crystalline particle can be adjusted by changing a heat-treating temperature and a heat-treating time. For example, a larger size of $ZrO_2$ crystalline particle can be formed by increasing the heat-treating temperature or by increasing the heat-treating time. The optical-waveguide-forming layer 14 is, when being formed, considered to be in an amorphous state and not to contain a $ZrO_2$ crystalline particle. Since the $ZrO_2$ crystalline particle may be considered to be precipitated and formed by the heat-treatment, the particle size can be controlled very easily. Therefore, it is possible to easily control the particle size of the $ZrO_2$ crystalline particle to be equal to or smaller than 100 nm and the average distance between the crystalline particles to be equal to or greater than 100 nm or to be equal to or smaller than the wavelength of the light to be used by adjusting a concentration of $ZrO_2$, and adjusting the heat-treating temperature and the heat-treating time.

Although $ZrO_2$ produced by the above-described method is dispersed in a state of a crystalline particle, $ZrO_2$ acts similarly even if $ZrO_2$ is in a state of a non-crystalline particle.

A defect may be often formed in the optical-waveguide-forming layer 14 due to a lack of oxygen in case of forming the optical-waveguide-forming layer 14 by the above-described sputtering method. However, conducting a step of forming a $ZrO_2$ crystalline particle by annealing the optical-waveguide-forming layer 14 under an oxygen atmosphere or under an atmosphere containing oxygen such as air causes an oxygen to be introduced to the optical-waveguide-forming layer 14a to decrease a defect, thus stabilizing the refractive index. It is preferable that the heat-treating temperature is equal to or higher than 1000° C. since oxygen can be introduced easily.

Meanwhile, when forming an optical waveguide containing $ZrO_2$ by using sol-gel method like Reference Literatures 1 and 2 for example, there are cases where an organic substance such as a solvent resides in the optical waveguide. Therefore, conducting a heat-treatment of equal to or higher than 1000° C. often causes the residing organic substance to be gasified to produce a bubble in the optical waveguide. Since an organic substance absorbs a specific wavelength of infrared ray, the organic substance causes an increase in a waveguide loss if the organic substance is contained in the optical waveguide.

In contrast, the optical-waveguide-forming layer 14 not containing an organic substance can be formed in case of using the above-described sputtering method. Therefore, a particle size of a $ZrO_2$ crystalline particle in the optical-waveguide-forming layer 14a and an average distance between crystalline particles can be controlled by conducting a heat-treatment at equal to or higher than 1000° C. without producing a bubble. An increase in a waveguide loss of the optical waveguide 13 is also prevented.

Figure 4:
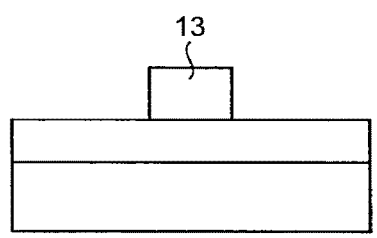
FIG. 4 is a drawing explaining an example of a method for producing the optical waveguide element illustrated in FIG. 1.

After that, the optical-waveguide-forming layer 14a is patterned by a photolithography technique and an etching as illustrated in FIG. 4 to form the optical waveguide 13. The etching may be a dry-etching using a fluorine-based gas (for example, $CF_4$) which is used in a process of fabricating a silica-based glass, for example.

Most of $ZrO_2$ are dispersed in the optical-waveguide-forming layer 14a in a state of a crystalline particle. The optical-waveguide-forming layer 14a is hereby easy to be fabricated by etching.

Figure 5:
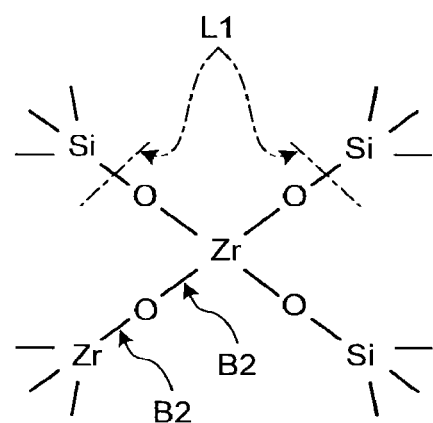
FIG. 5 is a view for explaining an etching of a conventional silica-based glass containing $ZrO_2$.

FIG. 5 is a view for explaining an etching of a conventional silica-based glass containing $ZrO_2$. As illustrated in FIG. 5, in case of the conventional silica-based glass containing $ZrO_2$, $SiO_2$ and $ZrO_2$ form a network in an amorphous state. Since a bond of an O atom and an Si atom (Si—O bond) in this state can be broken easily by a plasma of a fluorine-based gas as illustrated by a line L1, etching is easy. In contrast, like a bond B2, a bond of an O atom and a Zr atom (Zr—O bond) cannot be broken easily by a plasma of a fluorine-based gas. In case where an $SiO_2$ and a $ZrO_2$ form a network in a silica-based glass, the Zr—O bond must be broken for etching since the Zr—O bonds are dispersed in the network. Accordingly, conducting a predetermined amount of etching takes time because an etching rate slows down.

Figure 6:
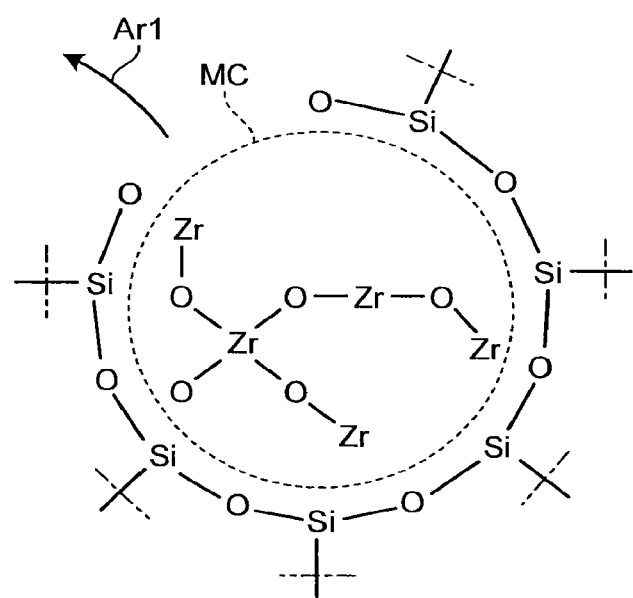
FIG. 6 is a view for explaining the etching in FIG. 4.

In contrast, FIG. 6 is a view for explaining an etching in FIG. 4. In case of FIG. 4, most of $ZrO_2$ are dispersed in a state of a crystalline particle MC in an $SiO_2$ network. In this case, the whole crystalline particle MC can be etched by cutting an Si—O bond at an alternate long and short dash line illustrated and without cutting the Zr—O bond contained in the crystalline particle MC. The crystalline particle MC desorbs from the $SiO_2$ network easily as illustrated by an arrow Ar1 while maintaining the state of a crystalline particle. Since the etching rate is greater than that in a case where the Zr—O bond must be broken, a time required to conduct a predetermined quantity of etching is shortened. Since an ordinary fabrication process for a silica-based glass-based PLC element is applied suitably to conduct a sufficient etching, an equipment cost can be saved. Therefore, an optical waveguide element can be produced at a lower cost.

An effect of increasing the etching rate can be obtained sufficiently if the $ZrO_2$ crystalline particle size is equal to or smaller than 100 nm and the average distance between crystalline particles is equal to or larger than 100 nm and equal to or smaller than the wavelength of the light to be used.

Figure 7:
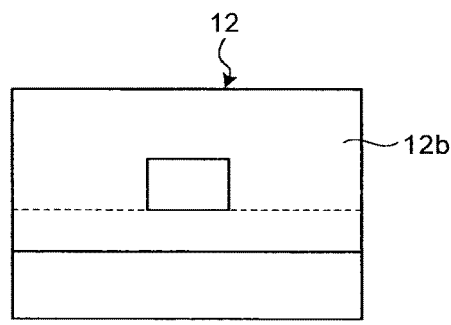
FIG. 7 is a drawing explaining an example of a method for producing the optical waveguide element illustrated in FIG. 1.

After that, an upper cladding portion 12b is formed to cover the lower cladding layer 12a and the optical waveguide 13 to form the cladding portion 12 constituted by the lower cladding layer 12a and the upper cladding portion 12b as illustrated in FIG. 7. The upper cladding portion 12b can be formed by stacking a particle made of a silica-based glass to cover the lower cladding layer 12a and the optical waveguide 13 by, for example, a known Flame Hydrolysis Deposition (FHD) method and by heating and melting the particle to be vitrified transparently.

In case of forming the upper cladding portion 12b by FHD method as described above, a heat treatment is conducted at, for example, approximately 1000° C. As described above, when an organic substance resides in the optical waveguide, there are cases where the residing organic substance is gasified to produce a bubble by the heat-treatment. In contrast, in case of forming an optical waveguide by the sputtering method as described above, the upper cladding portion 12b can be formed by FHD method without producing a bubble.

A heat-treatment for forming a $ZrO_2$ crystalline particle at a temperature equal to or higher than the heat-treating temperature in FHD method is preferable since the heat treatment in FHD method changes a change in the $ZrO_2$ crystalline particle very little. That is, it is preferable that a heat treatment temperature at which a $ZrO_2$ crystalline particle is formed is the highest in a thermal history in a production process since a change in the $ZrO_2$ crystalline particle changes very little even if a heat-treatment is conducted subsequently at a temperature equal to or lower than the highest heat treatment temperature. For such a heat-treatment, there is a step of heat-treating a surface of the cladding portion 12 for forming an insulating film made of $SiN_x$ at a temperature of approximately 400° C.

According to the producing method described above, the optical waveguide element 10 illustrated in FIG. 1 can be produced at a low cost since a time for etching the optical-waveguide-forming layer 14a to form the optical waveguide 13 is shortened.

Then, samples were produced by forming a lower cladding layer made of a silica glass on a silicon substrate and by further forming an optical-waveguide-forming layer on the lower cladding layer by the sputtering method under an oxygen atmosphere by using the $SiO_2$ target and the $ZrO_2$ target according to the steps explained with reference to FIGS. 2 to 4. The concentrations of $ZrO_2$ were adjusted to obtain 4.7%, 9.27%, 11.60%, and 13.94% of relative refractive-index differences of the optical-waveguide-forming layers relative to the lower cladding layers. After that, the optical-waveguide-forming layers of the produced samples were heat-treated at annealed temperatures set at intervals of 100° C. from 800° C. to 1300° C. for one hour. For the heat-treated samples, an x-ray diffraction (XRD) pattern and a refractive index of the optical-waveguide-forming layer were measured and TEM observation was conducted.

Figure 8:
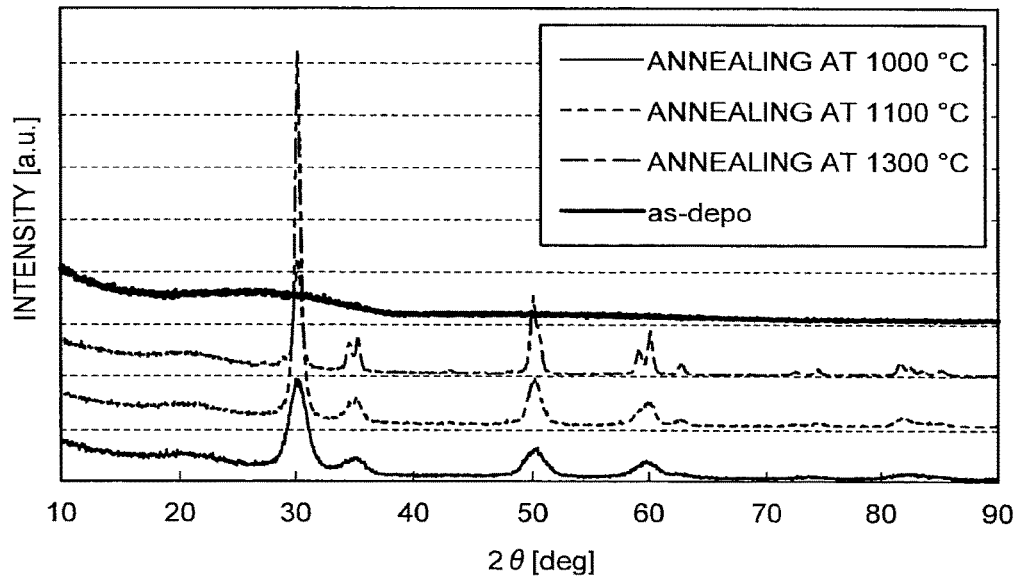
FIG. 8 is a drawing illustrating XRD patterns at different heat-treating temperatures.

FIG. 8 is a drawing illustrating XRD patterns at different annealed temperatures. FIG. 8 is a data on a sample of which relative refractive-index difference of an optical-waveguide-forming layer is 11.60%. A term "as-depo" indicates a data on a sample not annealed. As illustrated in FIG. 8, since no peak is present in a state of as-depo, the optical-waveguide-forming layer is considered to be in an amorphous state. The samples heat-treated at temperatures of 1000° C. to 1300° C. indicated more acute peaks caused by a $ZrO_2$ crystal corresponding to higher annealed temperatures. The results shown in FIG. 8 indicate that a greater size of $ZrO_2$ crystalline particle precipitates at a higher annealed temperature. Particle sizes of $ZrO_2$ crystalline particles of the samples annealed at the respective temperatures were estimated by using Scherrer's Equation from the data shown in FIG. 8. As a result, particle sizes were approximately 1.2 nm, approximately 2 nm, and approximately 5 nm for the samples annealed at 1000° C., 1100° C., and 1300° C. respectively.

Figures 9, 10:
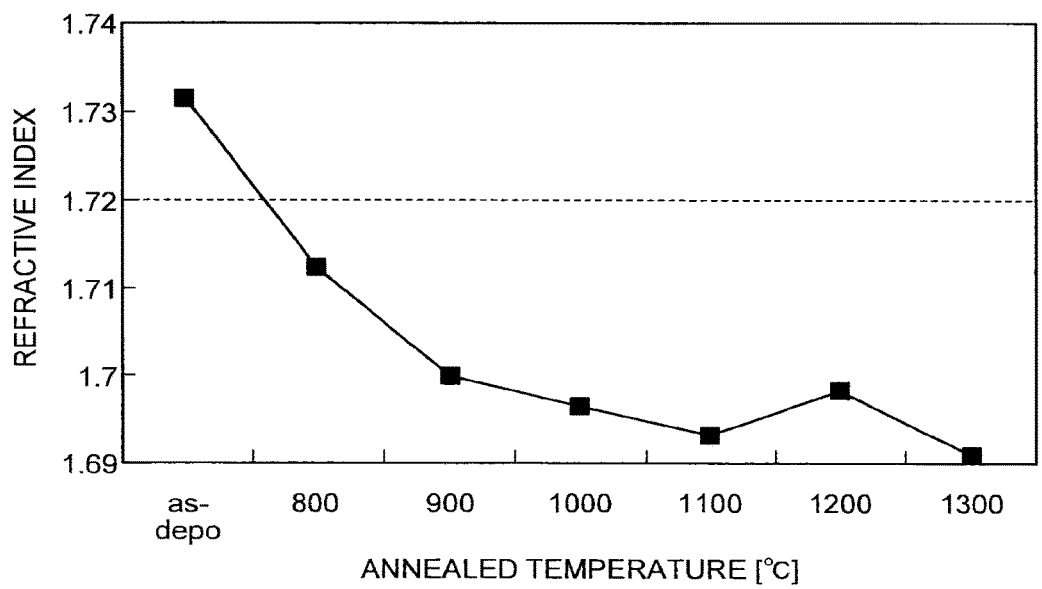
FIG. 9 is a view illustrating a relationship between an annealed temperature and a refractive index.
FIG. 10 is a view illustrating etching rates in a comparative example, an example, and a reference example.

FIG. 9 is a view illustrating a relationship between an annealed temperature and a refractive index. FIG. 9 is a data on the sample of which relative refractive-index difference of the optical-waveguide-forming layer is 11.60%. FIG. 9 indicates that a refractive index is high in a state of as-depo, and a refractive index of a sample annealed at equal to or higher than 1000° C. is stable within 1.69 to 1.7. The result shown in FIG. 9 is considered to indicate that, when setting the annealed temperature at equal to or higher than 1000° C., the refractive index becomes stable because an oxygen is introduced to the optical-waveguide-forming layer.

Average distances between $ZrO_2$ crystalline particles of the samples annealed at respective temperatures were subjected to TEM observation.

It was observed that the $ZrO_2$ crystalline particles were present in dispersion for the samples annealed at temperatures of 1000° C., 1100° C., and 1300° C., and the average distance between particles of any sample was equal to or longer than 100 nm and equal to or smaller than 1.62 µm. Herein the average distance between particles means a minimum distance between outer edges of adjacent particles.

After that, the sample (comparative example) indicated as as-depo and the sample (example) annealed at the temperature of 1100° C. were subjected to dry-etchings using a fluorine-based gas to measure etching rates.

FIG. 10 is a view illustrating etching rates in the comparative example, the example, and the reference example. Herein the reference example indicates an etching rate in case of conducting a dry-etching using a fluorine-based gas on a sample made of a silica glass which is doped with $GeO_2$. The silica glass was doped with $GeO_2$ so that a relative refractive-index difference relative to the silica glass is 1.5%.

As illustrated in FIG. 10, an etching rate for the sample of the comparative example not containing a $ZrO_2$ particle was low as 1.9 nm/sec which is ⅕ of an etching rate of 9.5 nm/sec of a sample of the reference example which is a material constituting a typical optical waveguide. In contrast, in case of the sample of the example containing a $ZrO_2$ crystalline particle, an etching rate was drastically high as 6.2 nm/sec which is approximately 3.3 times greater than that of the comparative example.

After that, optical waveguide elements as the examples of the present invention were produced by using a binary target containing $SiO_2$ and $ZrO_2$ according to the steps explained with reference to FIGS. 2 to 4. In the optical waveguide, a relative refractive-index difference relative to the cladding portion was 5% and a cross-sectional size was 3.0 µm×3.0 µm. In order to evaluate propagation losses, the optical waveguides were vortex-shaped circuits having different lengths and a bending radius of 500 µm. When producing the optical waveguide elements, an annealed temperature was set at 1300° C. for precipitating and forming a $ZrO_2$ crystalline particle.

Figure 11:
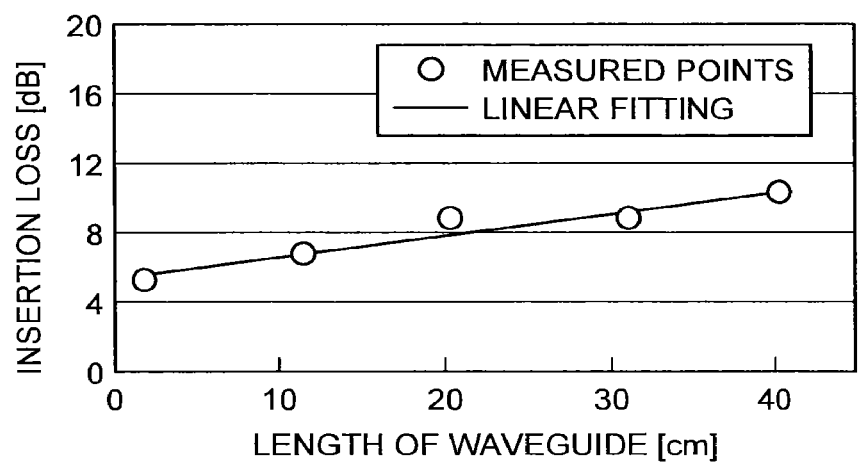
FIG. 11 is a view showing results of evaluating propagation loss of optical waveguide elements of the examples.

FIG. 11 is a view illustrating results of evaluating propagation loss of optical waveguide elements of the examples. A horizontal axis indicates a length of the optical waveguide and a vertical axis indicates an insertion loss. A propagation loss, of the optical waveguide, calculated by a linear fitting from the results of measured points shown in FIG. 11 was 0.13 dB/cm.

Figure 12:
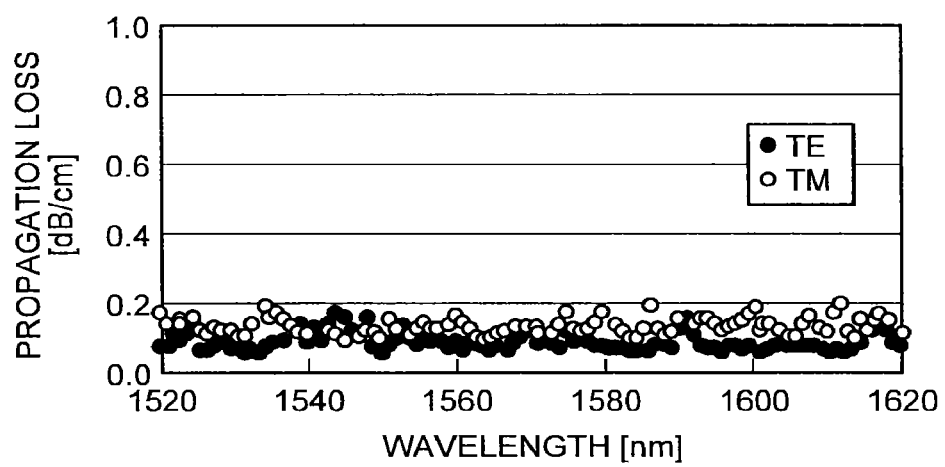
FIG. 12 is a view illustrating a propagation loss spectrum of the optical waveguide element of the example.

FIG. 12 is a view illustrating a propagation loss spectrum of the optical waveguide element of the example within a range of wavelengths 1520 nm to 1620 nm. As illustrated in FIG. 12, a propagation loss of the produced optical waveguide element was equal to or lower than 0.2 dB/cm over a 1550 nm wavelength band (wavelengths of 1520 nm to 1620 nm) in either one of a TM polarization and a TE polarization.

Figure 13:
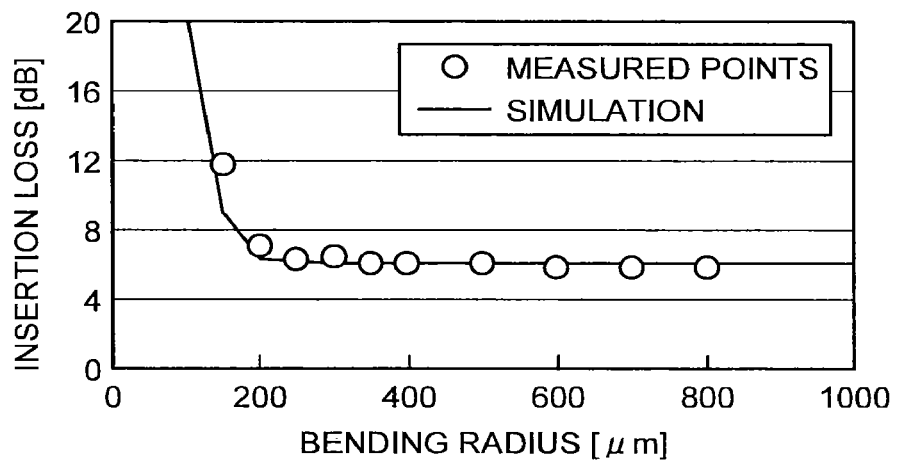
FIG. 13 is a view showing a relationship between bending radii and insertion losses of the optical waveguide elements of examples.

Meanwhile, an increase in a relative refractive-index difference of the optical waveguide relative to the cladding portion increases a confinement of a light and decreases a minimum bending radius. Therefore, the increase in the relative refractive-index difference is effective for reducing the optical waveguide element in size. For examples of the present invention, optical waveguide elements were produced in various bending radii to measure their insertion losses. In the optical waveguide, a relative refractive-index difference relative to the cladding portion was 5% and a cross-sectional size was 3.0 µm×3.0 µm. FIG. 13 is a view illustrating a relationship between bending radii and insertion losses of the optical waveguide elements of the examples. Data points indicate measured values, and a solid line indicates a simulation result. For an optical waveguide element having an optical waveguide made of a silica glass doped with $GeO_2$, a minimum bending radius is limited to approximately 1 mm. On the other hand, as illustrated in FIG. 13, the minimum bending radius of the produced optical waveguide element was reduced to a great extent, i.e., to approximately 300 μm, and coincided with the result of the simulation.

Figure 14:
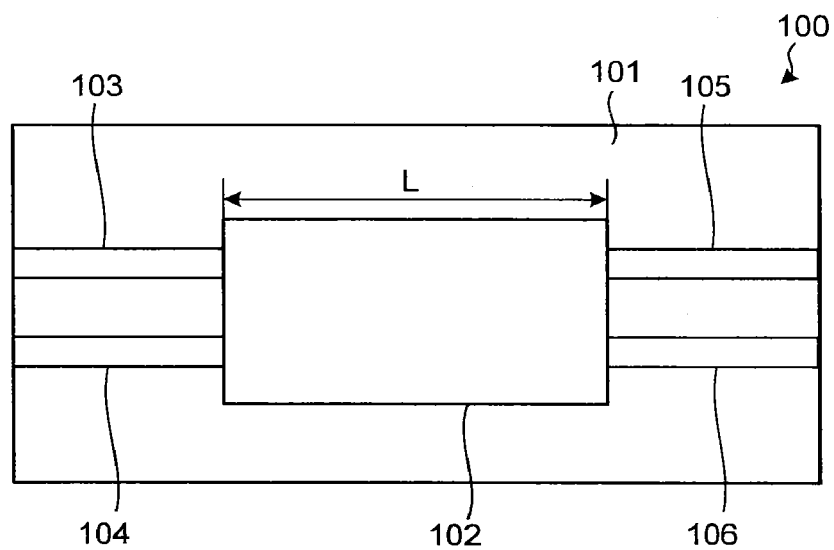
FIG. 14 is a schematic plan view of an MMI optical coupler of the example.

After that, a Multi-Mode Interference (MMI) optical coupler was produced as an example of the present invention. FIG. 14 is a schematic plan view of an MMI optical coupler of the example. The MMI optical coupler 100 includes a cladding portion 101 made of a silica glass, an MMI portion 102 and optical input/output portions 103, 104, 105, and 106 which are optical waveguides positioned in the cladding portion 101 and made of a silica glass in which a $ZrO_2$ particle is dispersed. A relative refractive-index difference of any of optical waveguides relative to the cladding portion was 5%. Cross-sectional sizes of the optical input/output portions 103, 104, 105, and 106 were 3.0 μm×3.0 μm. For cross-sectional sizes of the MMI portion 102, a thickness was 3.0 μm and a width was 24 μm. Both an interval between the optical input/output portions 103 and 104 and a distance between centers of the optical input/output portions 105 and 106 were 8.0 μm. A plurality of MMI optical couplers 100 were produced in which lengths of the MMI portions 102 (MMI length L) vary within a range of 310 μm to 510 μm.

Figure 15:
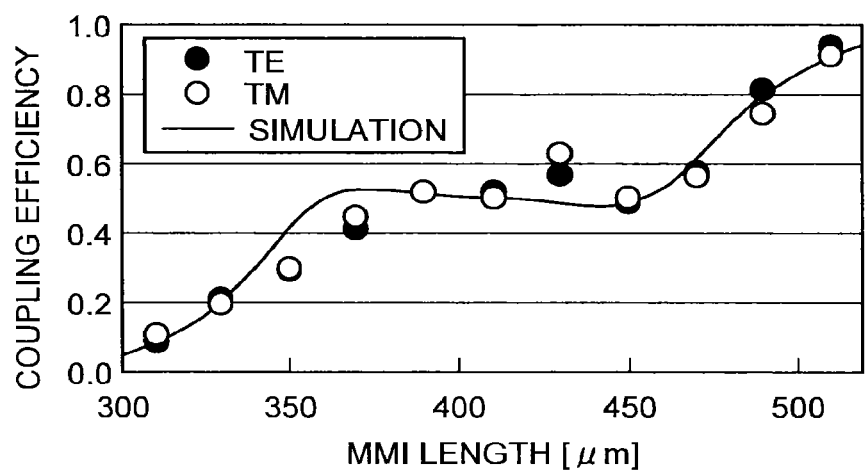
FIG. 15 is a view illustrating a relationship between an MMI length and a coupling efficiency of the MMI optical coupler of the example.
Figure 16:
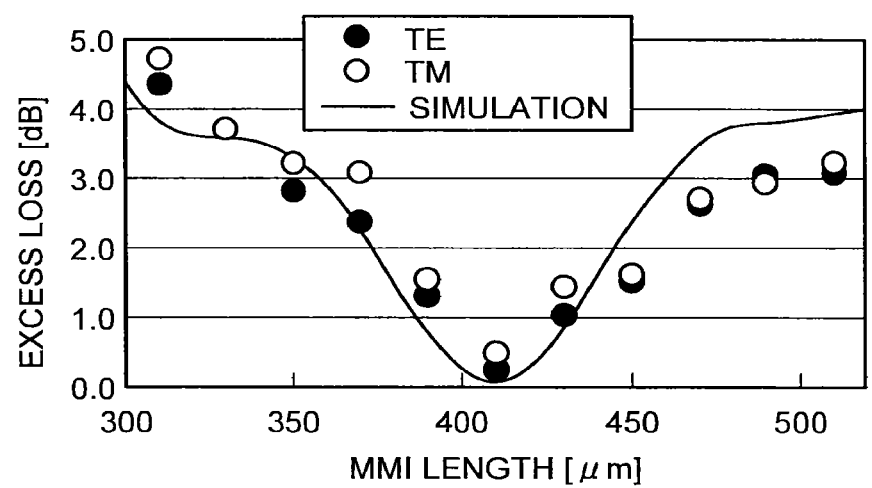
FIG. 16 is a view showing a relationship between an MMI length and an excess loss of the MMI optical coupler of the example.

FIG. 15 is a view illustrating a relationship between MMI lengths and coupling efficiencies of the MMI optical couplers of the examples. FIG. 16 is a view illustrating a relationship between MMI lengths and excess losses of the MMI optical couplers of the examples. Points of data in the drawing indicate results of measurement at TM polarization or TE polarization, and a solid line indicates a result of a simulation. As illustrated in FIGS. 14 and 15, the measured results coincided with the simulation result very well. The lowest value of an excess loss was 0.2 dB.

As described above, the optical waveguide element 10 according to Embodiment 1 can be used as an element configuring PLC-type optical waveguide elements having various functions, such as, for example, a waveguide-type interferometer and a demodulation element. Hereafter, optical waveguide elements having various functions as such and being small in size and low in cost will be explained.

Figure 17:
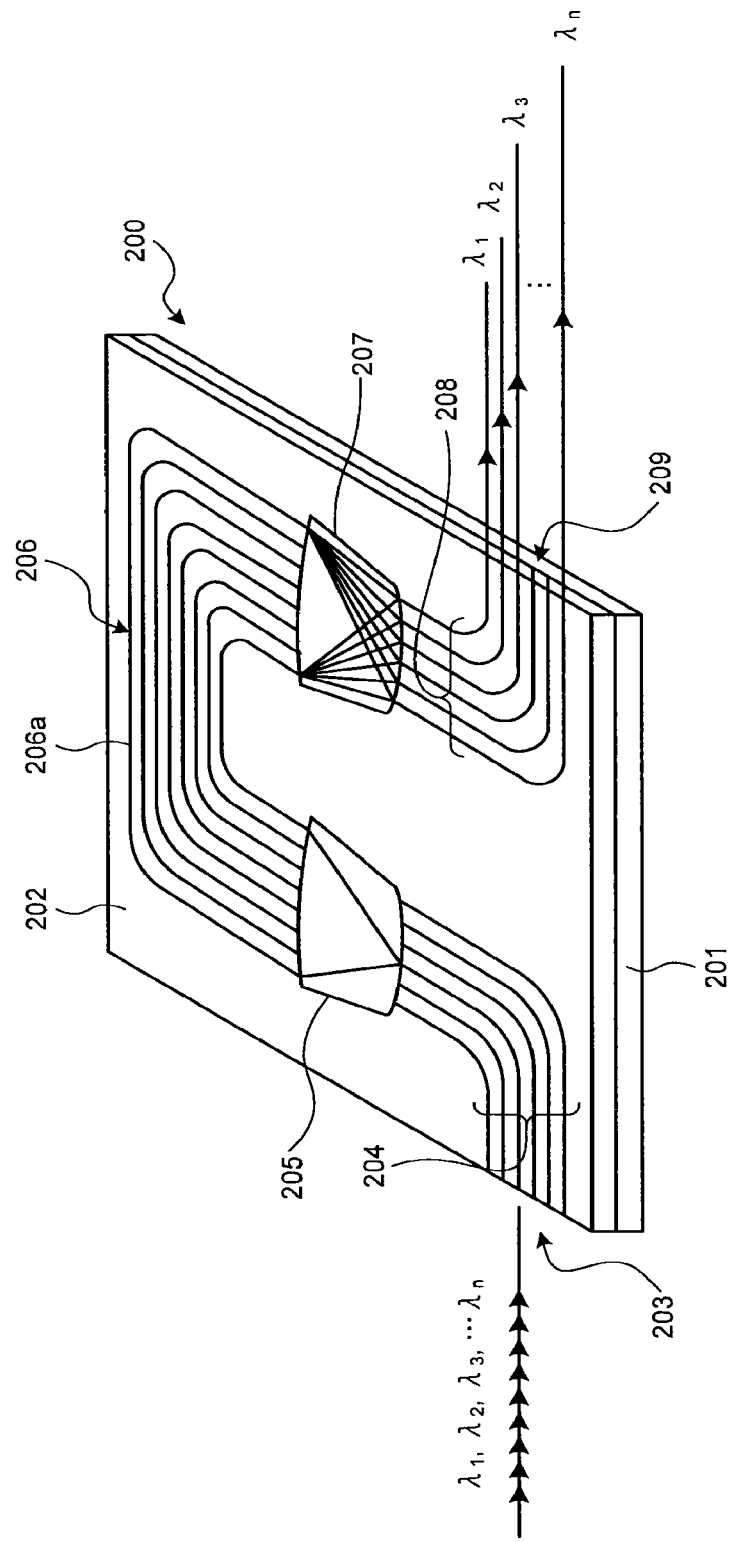
FIG. 17 is a schematic view of an AWG element according to Embodiment 2.

FIG. 17 is a schematic view of an Arrayed Waveguide Grating (AWG) element according to Embodiment 2. An AWG element 200 includes a cladding portion 202 made of a silica glass formed on a substrate 201 and a plurality of optical waveguides positioned inside the cladding portion 202. The plurality of waveguides includes a plurality of optical input waveguides 204, a first slab waveguide 205, an array waveguide 206, a second slab waveguide 207, and a plurality of optical output waveguides 208. The plurality of optical input waveguides 204 are disposed adjacent to each other and ends at one side thereof are optical input ports 203. The first slab waveguide 205 is connected to output sides of the plurality of optical waveguides 204. The array waveguide 206 is connected to an output side of the first slab waveguide 205. The second slab waveguide 207 is connected at an output side of the array waveguide 206. The plurality of optical output waveguides 208 are connected at an output side of the second slab waveguide 207 and disposed adjacent to each other. Ends of the plurality of optical output waveguides 208 at one side are optical output ports 209. The plurality of optical waveguides are made of silica glass in which $ZrO_2$ particles are dispersed.

The array waveguide 206 is formed by disposing a plurality of channel waveguides 206a adjacent to each other. The channel waveguides 206a being adjacent to each other differ in length from one another by a degree (set as ΔL) and form a phase portion in the AWG element 200. Normally, the channel waveguides 206a configuring the array waveguide 206 are provided numerously, for example, by a hundred pieces.

When a wavelength-multiplexed light having wavelengths λ1, λ2, λ3 . . . λn is inputted from one of the plurality of optical input ports 203 to corresponding one of the plurality of optical waveguides 204, the AWG element 200 condenses each of lights of the wavelengths λ1, λ2, λ3 . . . λn to different ones of the optical output waveguides 208 and outputs the lights from the different ones of the optical output ports 209. That is, the AWG element 200 has a wavelength-demultiplexing function. Since the AWG element 200 makes use of a principle of reciprocity of the optical circuit, the AWG element 200 has not only the wavelength-demultiplexing function but also a wavelength-multiplexing function.

At least one optical waveguide included in the plurality of optical input waveguides 204 may be an optical waveguide, the side of the optical input ports 203 of which is configured as a Spot-Size Converter (SSC) explained later. At least one optical waveguide included in the plurality of optical output waveguides 208 may be also an optical waveguide, the side of the optical output port 209 of which is configured as an SSC.

Figure 18:
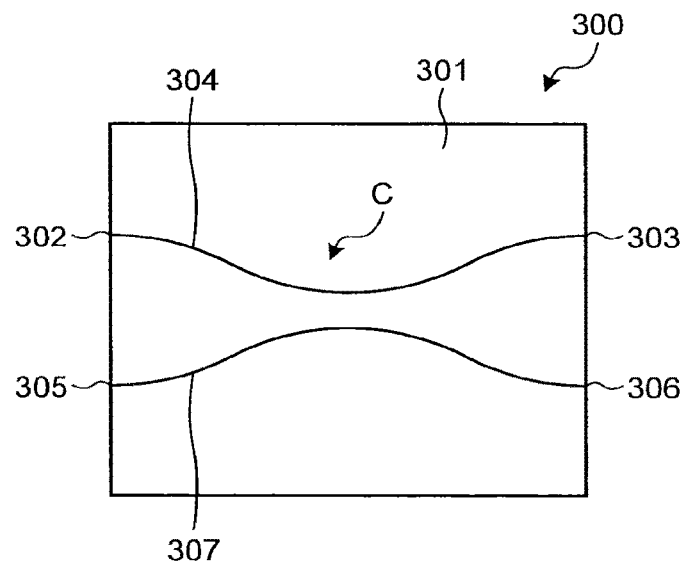
FIG. 18 is a schematic view of a directional coupler according to Embodiment 3.

FIG. 18 is a schematic view of a directional coupler according to Embodiment 3. A directional coupler 300 includes a cladding portion 301 made of silica glass and a plurality of optical waveguides positioned inside the cladding portion 301. The plurality of optical waveguides include a waveguide 304 two ends of which are optical input/output ports 302 and 303 respectively and a waveguide 307 two ends of which are optical input/output ports 305 and 306 respectively. Both the waveguide 304 and the waveguide 307 being bending waveguides are close to each other to form an optical coupling portion C. The waveguide 304 and the waveguide 307 may include straight portions at the optical coupling portion C. These two waveguides 304 and 307 are made of silica glass in which $ZrO_2$ particles are dispersed.

The directional coupler 300 has an optical branching function of, when a light is inputted from, for example, the optical input/output port 302, dividing the light at the optical coupling portion C to the waveguide 304 and the waveguide 307 by a predetermined branching ratio to output the lights from the optical input/output ports 303 and 306. Since the directional coupler 300 makes use of the principle of reciprocity of the optical circuit, the directional coupler 300 has not only the optical branching function but also the optical combining function.

Figure 19:
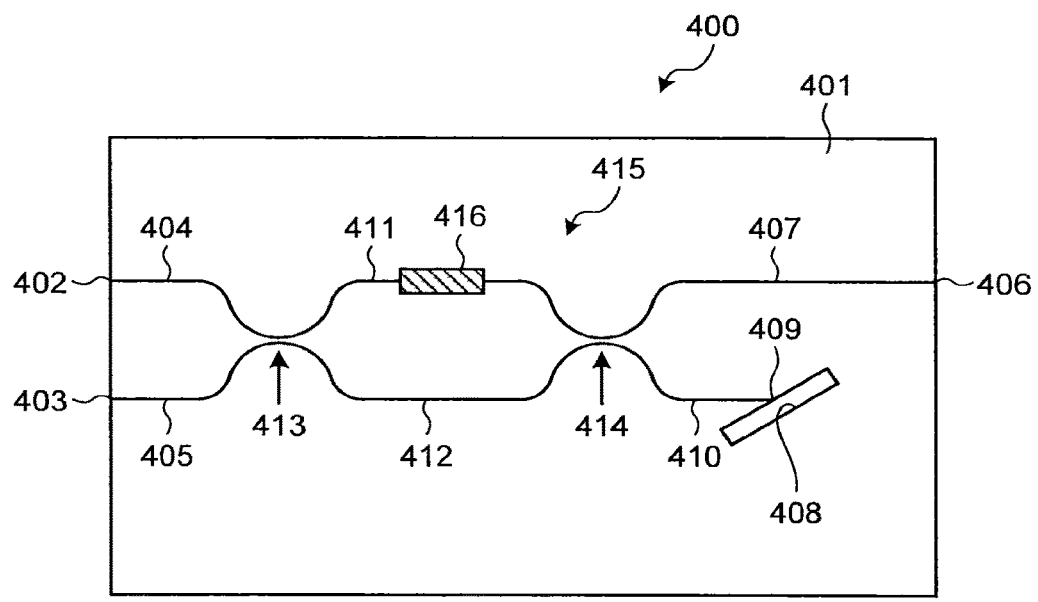
FIG. 19 is a schematic view of an MZI element according to Embodiment 4.

FIG. 19 is a schematic view of an MZI element according to Embodiment 4. An MZI element 400 includes a cladding portion 401 made of silica glass and a plurality of optical waveguides positioned inside the cladding portion 401. The plurality of optical waveguides include optical input waveguides 404 and 405, an optical output waveguide 407, an idle waveguide 410, an arm waveguide 411, and an arm waveguide 412. Ends at one side of the optical input waveguides 404 and 405 are optical input ports 402 and 403, respectively. An end at one side of the optical output waveguide 407 is an optical output port 406. The idle waveguide 410 being terminated at a crossing portion 409 at which the idle waveguide 410 crosses with a slit 408 formed in the cladding portion 401. The arm waveguide 411 is connected to the optical input waveguide 404 and the optical output waveguide 407. The arm waveguide 412 is connected to the optical input waveguide 405 and the idle waveguide 410. The plurality of optical waveguides are made of silica glass in which $ZrO_2$ particles are dispersed.

The optical input waveguides 404 and 405, and the arm waveguides 411 and 412 configure a directional coupler 413. The optical output waveguide 407, the idle waveguide 410, and the arm waveguides 411 and 412 configure a directional coupler 414. The directional couplers 413 and 414, and the arm waveguides 411 and 412 configure a 2×2 type of MZI 415. Moreover, a heater 416 is provided on a surface of the cladding portion 401 immediately above the arm waveguide 411.

At the MZI element 400, by heating the arm waveguide 411 with the heater 416 to change its refractive index, interference condition for lights being inputted from the optical input ports 402 and 403 respectively can be changed. Hereby the MZI element 400 serves as an optical switch selectively outputting from the optical output port 406 any one of the lights being inputted from the optical input ports 402 and 403 respectively. The MZI element 400 may as well serve as an optical switch outputting a light being inputted to the optical output port 406 selectively from any one of the optical input ports 402 and 403.

At least one of the directional couplers 413 and 414 may be replaced with an MMI or a Y-branch waveguide. It is preferable that the MMI or the Y-branch waveguide as such be configured by an optical waveguide made of silica glass in which $ZrO_2$ particles are dispersed. In a case of replacing the directional coupler 413 with, for example, the Y-branch waveguide, any one of the optical input waveguide 404 and 405 and a corresponding one of the optical input ports 402 and 403 may not have to be provided.

Figure 20:
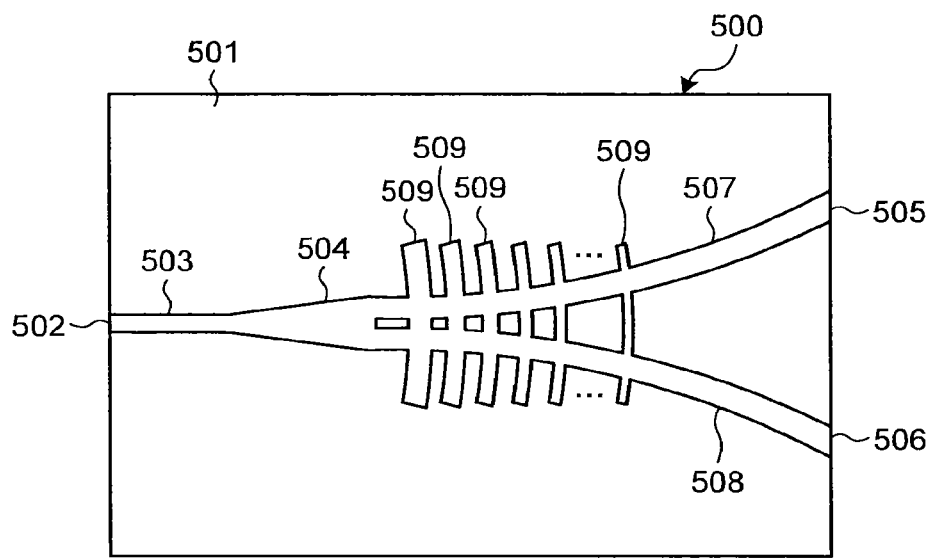
FIG. 20 is s schematic view of a Y-branch element according to Embodiment 5.

FIG. 20 is a schematic view of a Y-branch element according to Embodiment 5. A Y-branch element 500 includes a cladding portion 501 made of silica glass and a plurality of optical waveguides positioned inside the cladding portion 501. The plurality of optical waveguides include an optical input port 503, a tapered waveguide 504, two branching waveguides 507 and 508, and a plurality of strip waveguides 509. An end at one side of the optical input/output port 503 is an optical input/output port 502. The tapered waveguide 504 is connected to the optical input/output port 503. Ends at one side of the branching waveguides 507 and 508 are optical output ports 505 and 506 respectively. The plurality of strip waveguides 509 and the branching waveguides 507 and 508 cross. The plurality of optical waveguides are made of silica glass in which $ZrO_2$ particles are dispersed.

The Y-branch element 500 has an optical branching function of, when a light is inputted from, for example, the optical input port 502, dividing the light into two lights and outputting the lights from the optical output ports 505 and 506 respectively. Since the Y-branch element 500 makes use of the principle of reciprocity of the optical circuit, the Y-branch element 500 has not only the optical branching function but also the optical combining function.

The number of the strip waveguides 509 in the Y-branch element 500, for example, 30 pieces, may not be limited to a specific number. The strip waveguides 509 may not have to be provided.

Figure 21:
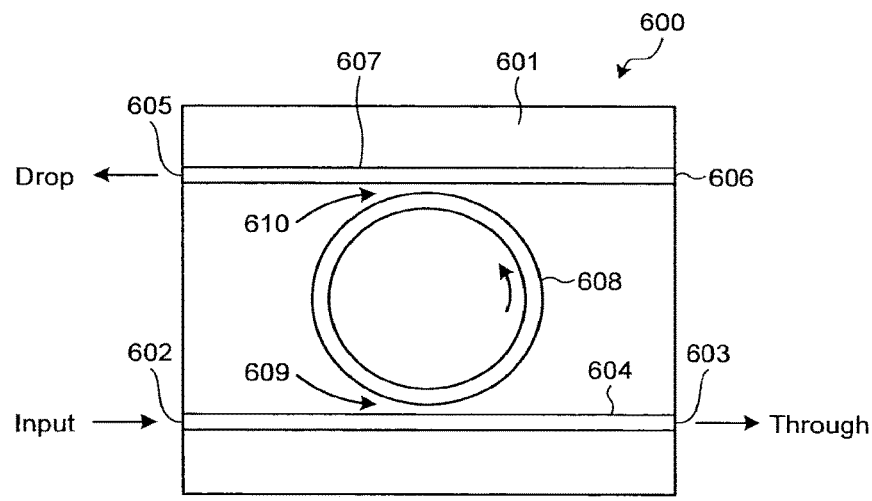
FIG. 21 is a schematic view of a ring resonator according to Embodiment 6.

FIG. 21 is a schematic view of a ring resonator according to Embodiment 6. A ring resonator 600 includes a cladding portion 601 made of silica glass and a plurality of optical waveguides positioned inside the cladding portion 601. The plurality of optical waveguides include a straight-shaped bus waveguide 604, a straight-shaped bus waveguide 607, and a ring-shaped ring waveguide 608. Two ends of the bus waveguide 604 are optical input/output ports 602 and 603 respectively. Two ends of the bus waveguide 607 are optical input/output ports 605 and 606 respectively. The ring waveguide 608 is disposed between the bus waveguide 604 and the bus waveguide 607. The plurality of optical waveguides are made of silica glass in which $ZrO_2$ particles are dispersed.

The bus waveguide 604 and the ring waveguide 608, while being separated with a slight gap, are connected optically to configure a directional coupler 609 of which coupling coefficient is κ. Similarly, the bus waveguide 607 and the ring waveguide 608, while being separated with a slight gap are connected optically to configure a directional coupler 610 of which coupling coefficient is κ.

The ring resonator 600 serves as an optical resonator filter having a periodical reflection spectrum with a frequency period corresponding to a circumference of the ring waveguide 608. Therefore, for example, when a light is inputted from the optical input/output port 602, the light is guided in the bus waveguide 604, light component having a predetermined optical frequency is subjected to optical coupling with the ring waveguide 608, goes around the ring waveguide 608, and is subjected to optical coupling to the bus waveguide 607 to be guided in the bus waveguide 607, and then is outputted from the optical input/output port 605 as a Drop port. On the other hand, light component having an optical frequency other than the predetermined optical frequency is not subjected to optical coupling with the ring waveguide 608 and is propagated in the bus waveguide 604, and then is outputted from the optical input/output port 603 as a Through port.

The bus waveguide 604 is separated from the ring waveguide 608 in the directional coupler 609 in the ring resonator 600. However, a configuration of connecting the bus waveguide 604 to the ring waveguide 608 with a waveguide is preferable because variation in coupling coefficient κ can be restrained. Same configuration may apply to the directional coupler 610. At least any one of the directional couplers 609 and 610 may be replaced with an MMI. The number of the bus waveguides is not limited to two in the ring resonator according to Embodiment of the present invention and may be at least one.

Figure 22:
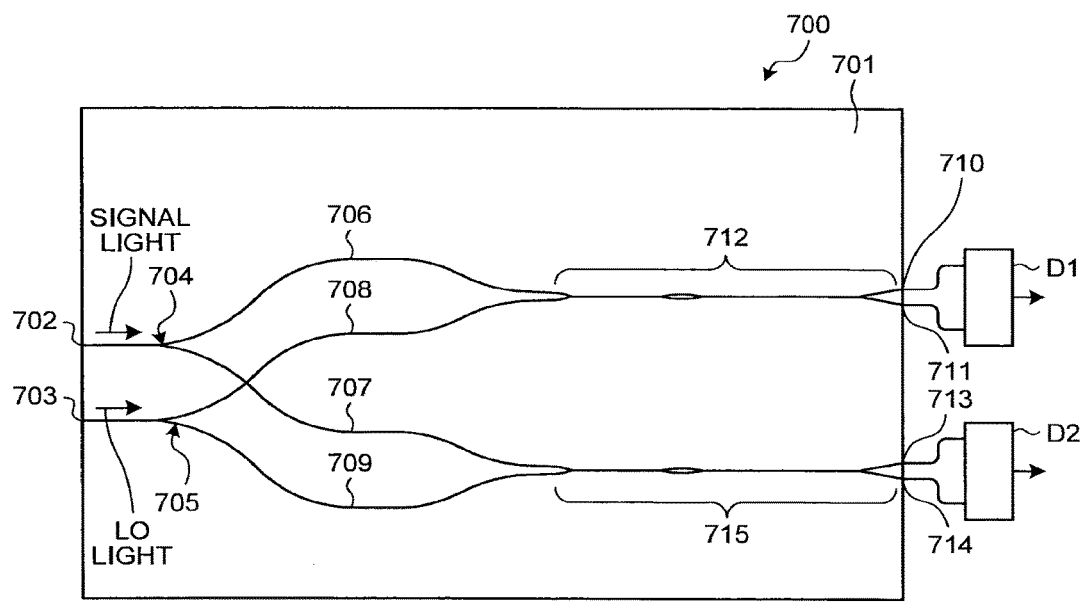
FIG. 22 is a schematic view of a 90-degree hybrid element according to Embodiment 7.

FIG. 22 is a schematic view of a 90-degree hybrid element according to Embodiment 7. A 90-degree hybrid element 700 being called an optical mixer includes a cladding portion 701 made of silica glass and a plurality of optical waveguides positioned inside the cladding portion 701. The plurality of optical waveguides include Y-branch waveguides 704 and 705, arm waveguides 706 and 707, arm waveguides 708 and 709, a Wavelength INsensitive Coupler (WINC) 712, and a WINC 715. Ends at one port side of the Y-branch waveguides 704 and 705 are optical input ports 702 and 703 respectively. The arm waveguides 706 and 707 are connected at two ports' side of the Y-branch waveguide 704 respectively. The arm waveguides 708 and 709 are connected at two ports' side of the Y-branch waveguide 705. Two ports at one side of the WINC 712 are connected to the arm waveguides 706 and 708 respectively, and end portions of two ports at the other side of the WINC 712 are optical output ports 710 and 711. Two ports at one side of the WINC 715 are connected to the arm waveguides 707 and 709 respectively, and end portions of two ports at the other side of the WINC 715 are optical output ports 713 and 714. The plurality of optical waveguides are made of silica glass in which $ZrO_2$ particles are dispersed.

The arm waveguides 707 and 708 cross at an angle α. In order to restrain optical loss at the crossing portion, it is preferable that the angle α be 60° to 90°.

The optical output ports 710 and 711 are connected to a balanced photo-diode D1, and the optical output ports 713 and 714 are connected to a balanced photo-diode D2.

The 90-degree hybrid element 700 is provided with first to fourth paths being four optical paths. The first path is a path reaching the WINC 712 from the optical input port 702 by way of the Y-branch waveguide 704 and the arm waveguide 706. The second path is a path reaching the WINC 712 from the optical input port 703 by way of the Y-branch waveguide 705 and the arm waveguide 708. The third path is a path reaching the WINC 715 from the optical input port 702 by way of the Y-branch waveguide 704 and the arm waveguide 707. The fourth path is a path reaching the WINC 712 from the optical input port 703 by way of the Y-branch waveguide 705 and the arm waveguide 709. Among the four optical paths, the first path and the third path are set to be identical in optical path length. Optical path lengths of the second path and the fourth path are set so that an optical path length difference corresponds to 90 degrees when being converted in phase of light.

In the 90-degree hybrid element 700, when a signal light modulated by DP-QPSK method is inputted from the optical input port 702, the Y-branch waveguide 704 divides the signal light to two signal lights and makes the divided signal lights be inputted to the WINCs 712 and 715 via the arm waveguides 706 and 707 respectively. On the other hand, when a local oscillation (LO) light is inputted from the optical input port 703, the Y-branch waveguide 705 divides the LO light into two LO lights and makes the two divided LO lights be inputted to the WINCs 712 and 715 via the arm waveguides 708 and 709 respectively. The WINC 712 combines the signal light and the LO light being inputted thereto and makes the combined lights interfere with each other, and then outputs lights of Q components, which are in reverse phases to each other, to the optical output ports 710 and 711. Similarly, the WINC 715 combines the signal light and the LO light being inputted thereto and makes the combined lights interfere with each other, and then outputs lights of I components, which are in reverse phases to each other, to the optical output ports 713 and 714. The balanced photo-diodes D1 and D2 receive these Q component and I component of lights to make these components of lights to be subjected to photoelectric conversion. That is, the 90-degree hybrid element 700 serves as a demodulation element. The signal lights being inputted may be one, being subjected to polarization-demultiplexed, of the signal lights modulated by dual polarization quadrature phase shift keying (DP-QPSK) method.

In the 90-degree hybrid element 700, at least one of the WINCs 712 and 715 may be replaced with an MMI.

Figure 23:
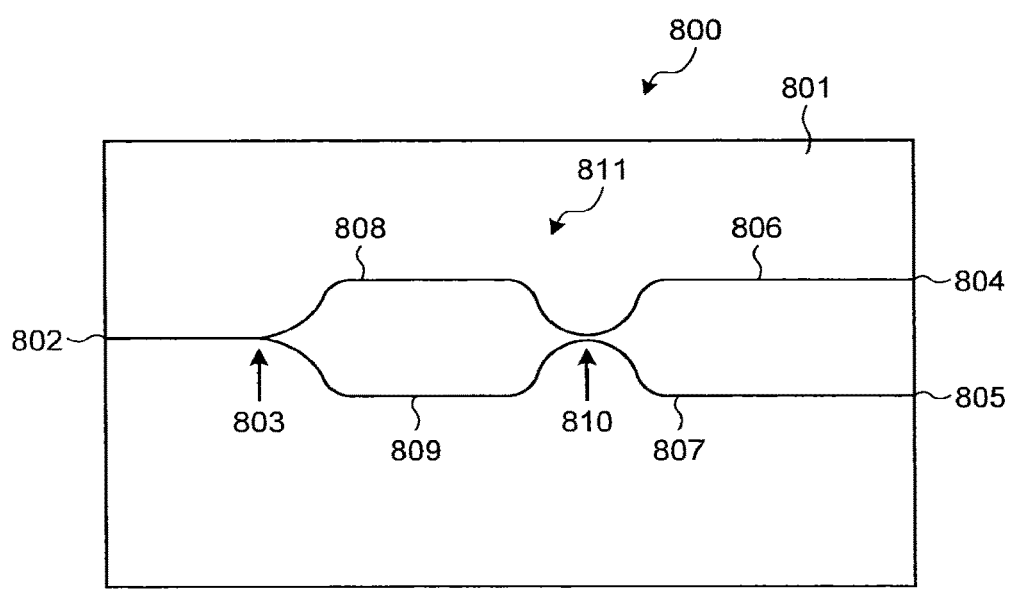
FIG. 23 is a schematic view of a polarization-beam splitter according to Embodiment 8.

FIG. 23 is a schematic view of a Polarization-Beam Splitter (PBS) according to Embodiment 8. A PBS 800 includes a cladding portion 801 made of silica glass and a plurality of optical waveguides positioned inside the cladding portion 801. The plurality of optical waveguides include a Y-branch waveguide 803, optical output waveguides 806 and 807, an arm waveguide 808, and an arm waveguide 809. An end portion at one-port side of the Y-branch waveguide 803 is an optical input port 802. End portions at one side of the optical output waveguides 806 and 807 are optical output ports 804 and 805 respectively. The arm waveguide 808 is connected to one of the two ports of the Y-branch waveguide 803 and the optical output waveguide 806. The arm waveguide 809 is connected to the other one of the two ports of the Y-branch waveguide 803 and the optical output waveguide 807. The plurality of optical waveguides are made of silica glass in which $ZrO_2$ particles are dispersed.

The optical power-outputting waveguides 806 and 807 and the arm waveguides 808 and 809 configure a directional coupler 810. The Y-branch waveguide 803, the directional coupler 810, and the arm waveguides 808 and 809 configure a 1×2 type of MZI 811.

In the PBS 800, lengths and birefringences of the arm waveguides 808 and 809 are set to have interference characteristics so that a light in TM polarization (polarization in the vertical direction to a substrate surface on which the cladding portion 801 is formed) contained in a light being inputted from the optical input port 802 at a predetermined wavelength is outputted by approximately 100% from one side (for example, at the optical output waveguide 806's side) of the directional coupler 810, and a light in TE polarization (polarization in the direction parallel to the substrate surface) is outputted by approximately 100% from the other side of the directional coupler 810 (for example, the optical output waveguide 807's side). Hereby the PBS 800 has a polarization-beam-splitting function of making the light being inputted from the optical input port 802 be subjected to polarization demultiplexing of the light in TE polarization and the light in TM polarization and outputting a light in each polarization from each of the optical output ports 804 and 805.

Since the PBS 800 makes use of the principle of reciprocity of the optical circuit, the PBS 800 has not only the polarization-beam-splitting function but also polarization-beams-combining function. Therefore, the PBS 800 serves as a polarization-beam splitter/combiner.

The birefringences of the arm waveguides 808 and 809 can be adjusted by making cross-sectional shapes of the arm waveguides 808 and 809 rectangle to provide form birefringences, or forming stress-releasing grooves at the cladding portion 801 in the vicinity of the arm waveguides 808 and 809 to hereby provide stresses to the arm waveguides 808 and 809 and provide birefringences.

In the PBS 800, at least any one of the Y-branch waveguide 803 and the directional coupler 810 may be replaced with an MMI.

Figure 24A:
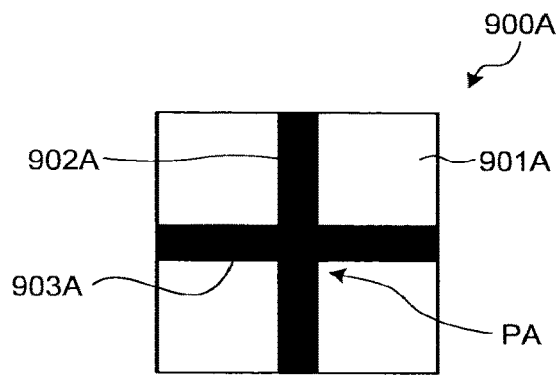
FIGS. 24A to 24C are schematic views of crossing structures of optical waveguide elements according to Embodiments 9 to 11, respectively.
Figure 24B:
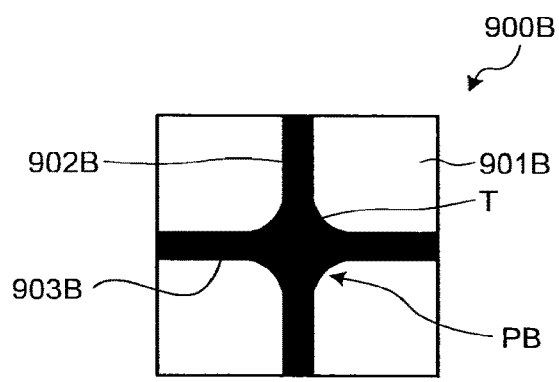
Figure 24C:
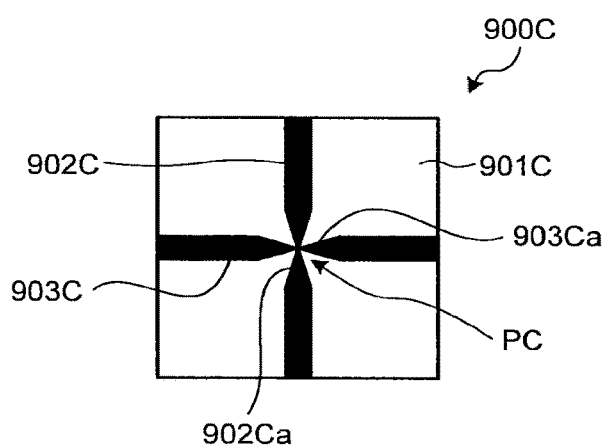

FIGS. 24A to 24C are schematic views of crossing structures of optical waveguide elements according to Embodiments 9 to 11 respectively.

An optical waveguide element 900A shown in FIG. 24A includes a cladding portion 901A made of silica glass and two optical waveguides 902A and 903A positioned inside the cladding portion 901A. The optical waveguides 902A and 903A are made of silica glass in which $ZrO_2$ particles are dispersed. The optical waveguides 902A and 903A extend in directions which cross to each other (orthogonal in present Embodiment) and cross at a crossing portion PA, thus configure a crossing structure.

An optical waveguide element 900B shown in FIG. 24B includes a cladding portion 901B made of silica glass and two optical waveguides 902B and 903B positioned inside the cladding portion 901B. The optical waveguides 902B and 903B are made of silica glass in which $ZrO_2$ particles are dispersed. The optical waveguides 902B and 903B extend in directions which cross to each other (orthogonal in present Embodiment) and cross at a crossing portion PB, thus configure a crossing structure. The optical waveguides 902B and 903B have a tapered portion T in which waveguide's width increases along with decrease in distance to the crossing portion PB. Optical loss at the crossing portion PB is decreased by the existence of the tapered portion T.

An optical waveguide element 900C shown in FIG. 24C includes a cladding portion 901C made of silica glass and two optical waveguides 902C and 903C positioned inside the cladding portion 901C. The optical waveguides 902C and 903C are made of silica glass in which $ZrO_2$ particles are dispersed. The optical waveguides 902C and 903C extend in directions which cross to each other (orthogonal in present Embodiment) and cross at a crossing portion PC, thus configure a crossing structure. The optical waveguides 902C and 903C have tapered portions 902Ca and 903Ca in which waveguides' widths decrease along with decrease in distance to the crossing portion PC. Optical loss at the crossing portion PC is decreased by the existences of the tapered portions 902Ca and 903Ca.

Figure 25A:
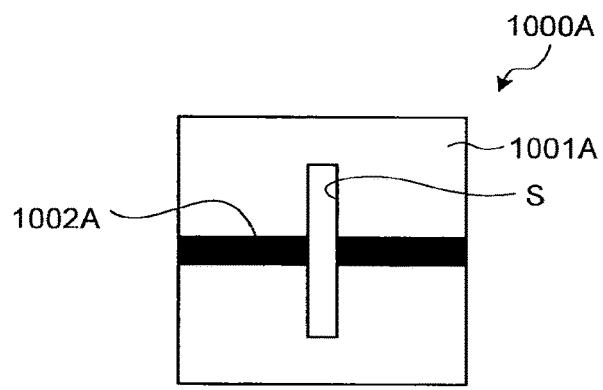
FIGS. 25A to 25C are schematic views of slit structures of optical waveguide elements according to Embodiments 12 to 14, respectively.
Figure 25B:
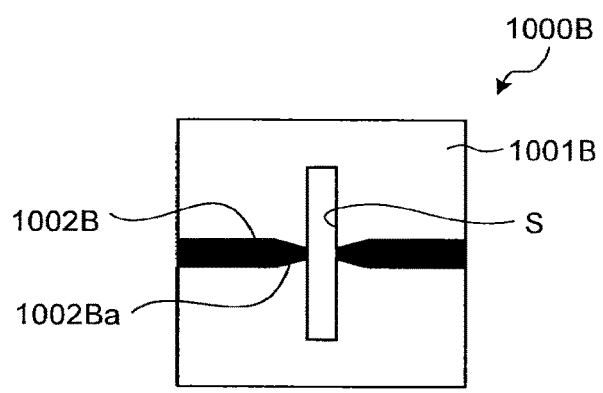
Figure 25C:
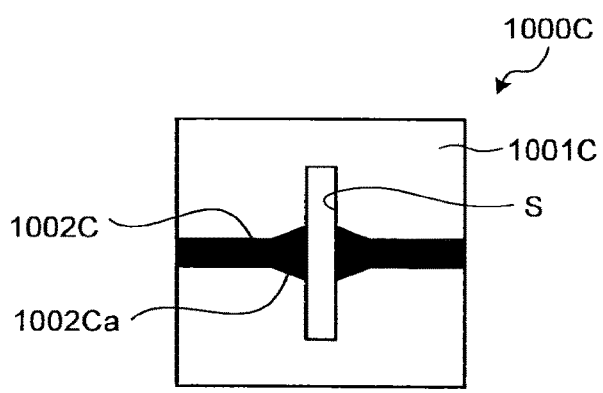

FIGS. 25A to 25C are schematic views of slit structures of optical waveguide elements according to Embodiments 12 to 14.

An optical waveguide element 1000A shown in FIG. 25A includes a cladding portion 1001A made of silica glass and an optical waveguide 1002A positioned inside the cladding portion 1001A. The optical waveguide 1002A is made of silica glass in which $ZrO_2$ particles are dispersed. A slit S is formed to divide the optical waveguide 1002A in the cladding portion 1001A. This slit S is formed in order to, for example, insert an optical filter thereinto, or provide a predetermined optical loss to the optical waveguide 1002A.

An optical waveguide element 1000B shown in FIG. 25B includes a cladding portion 1001B made of silica glass and an optical waveguide 1002B positioned inside the cladding portion 1001B. The optical waveguide 1002B is made of silica glass in which $ZrO_2$ particles are dispersed. A slit S is formed to divide the optical waveguide 1002B in the cladding portion 1001B. The optical waveguide 1002B has a tapered portion 1002Ba in which waveguide's width decreases along with decrease in distance to the slit S. Optical loss caused by the slit S is decreased by the existences of the tapered portion 1002Ba.

An optical waveguide element 1000C shown in FIG. 25C includes a cladding portion 1001C made of silica glass and an optical waveguide 1002C positioned inside the cladding portion 1001C. The optical waveguide 1002C is made of silica glass in which $ZrO_2$ particles are dispersed. A slit S is formed to divide the optical waveguide 1002C in the cladding portion 1001C. The optical waveguide 1002C has a tapered portion 1002Ca in which waveguide's width increases along with decrease in distance to the slit S. Optical loss caused by the slit S is decreased by the existence of the tapered portion 1002Ca.

Figure 26A:
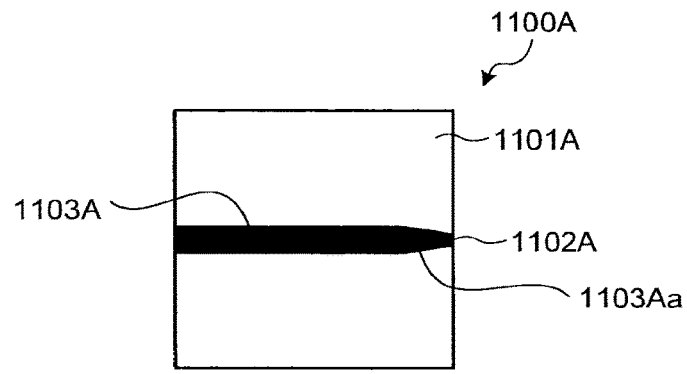
FIGS. 26A to 26C are schematic views of SSC structures of optical waveguide elements according to Embodiments 15 to 17, respectively.
Figure 26B:
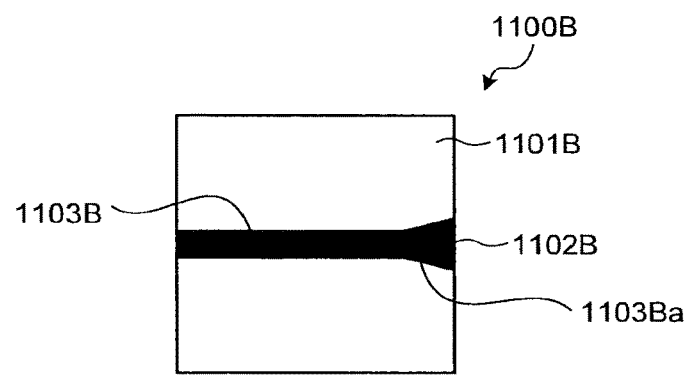
Figure 26C:
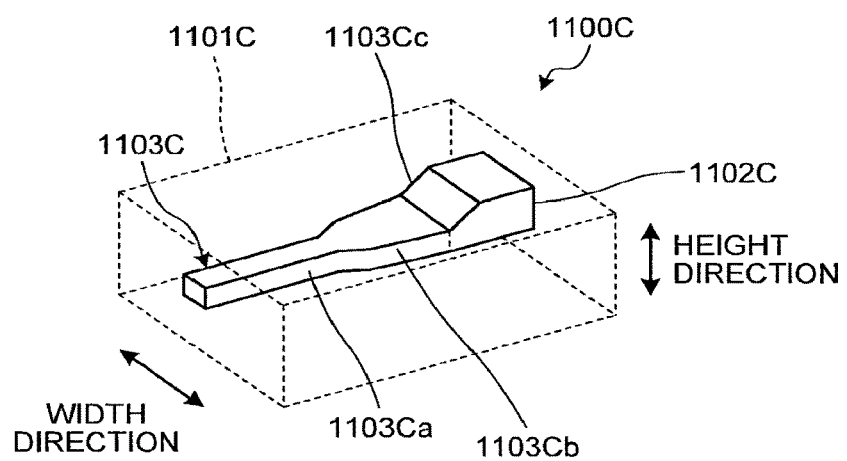

FIGS. 26A to 26C are schematic views of SSC structures of optical waveguide elements according to Embodiments 15 to 17.

An optical waveguide element 1100A shown in FIG. 26A includes a cladding portion 1101A made of silica glass and an optical waveguide 1103A positioned inside the cladding portion 1101A. An end portion of the optical waveguide 1103A is flush with an end surface of the cladding portion 1101A and is an optical input/output port 1102A. The optical waveguide 1103A is made of silica glass in which $ZrO_2$ particles are dispersed. The optical waveguide 1103A has a tapered portion 1103Aa in which waveguide's width decreases along with decrease in distance to the optical input/output port 1102A. Hereby the optical waveguide 1103A configures an SSC in which a light propagating in the tapered portion 1103Aa increases in spot size along with decrease in distance to the optical input/output port 1102A. As a result, when the optical waveguide 1103A is connected to an optical fiber at the optical input/output port 1102A, a connection loss thereat can be decreased.

An optical waveguide element 1100B shown in FIG. 26B includes a cladding portion 1101B made of silica glass and an optical waveguide 1103B positioned inside the cladding portion 1101B. An end portion of the optical waveguide 1103B is flush with an end surface of the cladding portion 1101B and is an optical input/output port 1102B. The optical waveguide 1103B is made of silica glass in which $ZrO_2$ particles are dispersed. The optical waveguide 1103B has a tapered portion 1103Ba in which waveguide's width increases along with decrease in distance to the optical input/output port 1102B. Hereby the optical waveguide 1103B configures an SSC in which a light propagating in the tapered portion 1103Ba increases in spot size along with decrease in distance to the optical input/output port 1102B.

An optical waveguide element 1100C shown in FIG. 26C includes a cladding portion 1101C made of silica glass and an optical waveguide 1103C positioned inside the cladding portion 1101C. An end portion of the optical waveguide 1103C is flush with an end surface of the cladding portion 1101C and is an optical input/output port 1102C. The optical waveguide 1103C is made of silica glass in which $ZrO_2$ particles are dispersed. The optical waveguide 1103C has a structure in which a straight portion 1103Ca, a width-direction tapered portion 1103Cb, and a height-direction tapered portion 1103Cc are connected in this order. A cross section of the straight portion 1103Ca is approximately constant in size in a longitudinal direction. A waveguide's width of the width-direction tapered portion 1103Cb increases along with decrease in distance to the optical input/output port 1102C. A waveguide's height of the height-direction tapered portion 1103Cc increases initially along with decrease in distance to the optical input/output port 1102C and becomes constant subsequently at the optical input/output port 1102C's side. Hereby the optical waveguide 1103B configures an SSC in which the light propagating in the optical waveguide 1103C increases in spot size in the width direction along with decrease in distance to the optical input/output port 1102B in the width-direction tapered portion 1103Cb and increases in spot size in the height direction initially and subsequently becomes constant in the height direction tapered portion 1103Cc.

Figure 27:
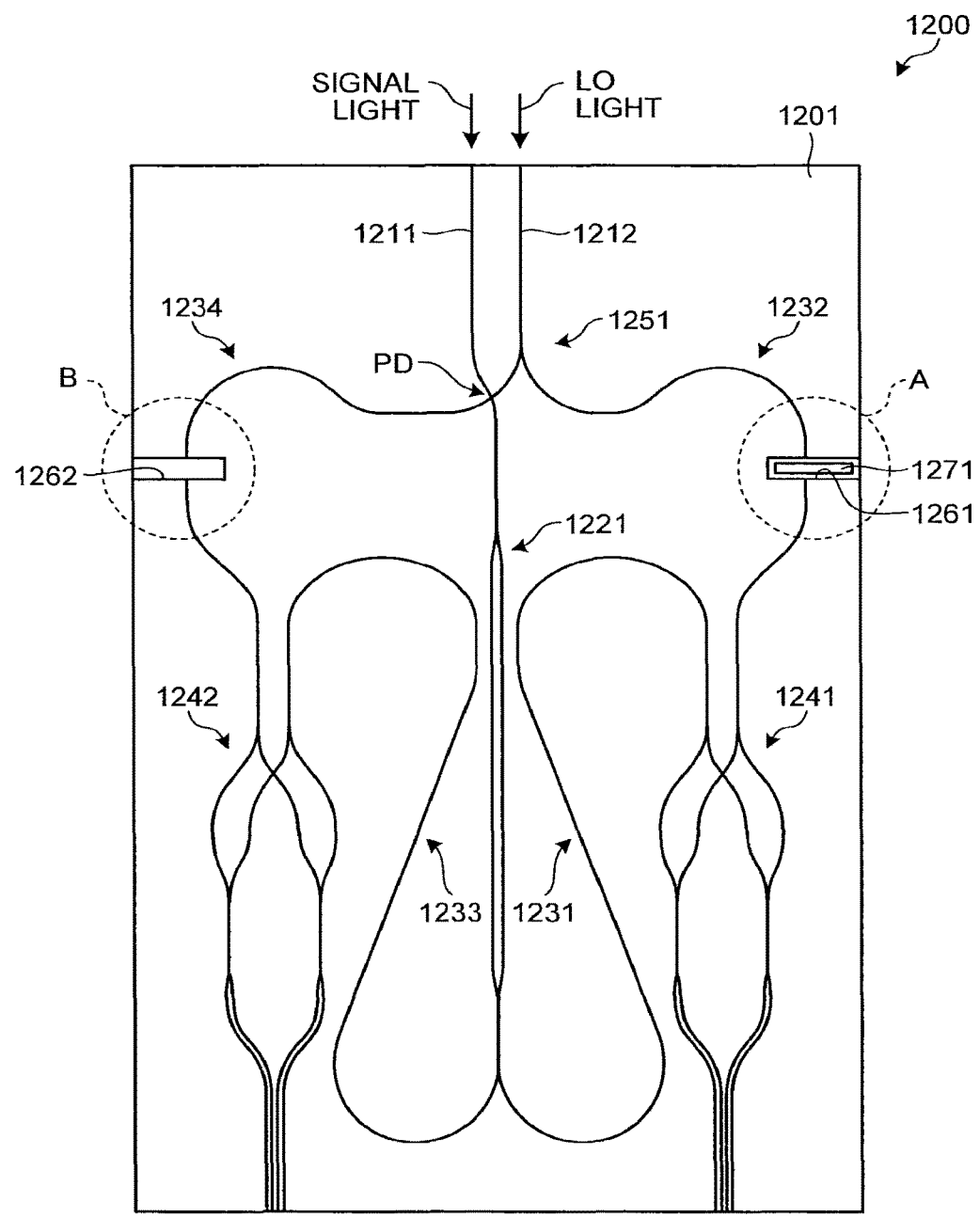
FIG. 27 is a schematic view of a coherent mixer according to Embodiment 18.

FIG. 27 is a schematic view of a coherent mixer according to Embodiment 18, in which a PBS is integrated.

A coherent mixer 1200 shown in FIG. 27 is an example of configuration assumed to be used as a coherent mixer for use in a demodulation device by a DP-QPSK method. The coherent mixer 1200 includes a cladding portion 1201 made of silica glass and a plurality of optical waveguides positioned inside the cladding portion 1201. The plurality of optical waveguides includes input optical waveguides 1211 and 1212, optical waveguides configuring a PBS 1221, connection optical waveguides 1231, 1232, 1233, and 1234, optical waveguides configuring 90-degree hybrid elements 1241 and 1242, Y-branch waveguide 1251. The plurality of optical waveguides are made of silica glass in which $ZrO_2$ particles are dispersed. The coherent mixer 1200 further includes a slit 1261, a slit 1262 as a loss compensation portion, and a ½ wavelength plate 1271.

The input optical waveguide 1211, into which a signal light is inputted, is connected to the PBS 1221 via an S-shaped bending portion in which bending portions are combined so that curvatures are reverse in positive and negative, curvature radii are identical, and angles of arcs are identical. On the other hand, the input optical waveguide 1212 into which a LO light is inputted is connected to the Y-branch waveguide 1251 in an approximate straight manner.

To be more specific, the PBS 1221 includes two arm optical waveguides connecting a Y-branch waveguide and a directional coupler, and has a configuration of an MZI. The connection optical waveguides 1231 and 1233 are optical paths making optical paths of lights split by the PBS 1221 connect to the 90-degree hybrid elements 1241 and 1242 respectively.

The Y-branch waveguide 1251 divides the LO light being inputted to the input optical waveguide 1212 into the connection optical waveguides 1232 and 1234 at a dividing ratio 1:1. The connection optical waveguides 1232 and 1234 are optical paths making optical paths of lights divided by the Y-branch waveguide 1251 connect to the 90-degree hybrid elements 1241 and 1242 respectively.

The 90-degree hybrid elements 1241 and 1242 are interference circuits of one kind, and circuits dividing the signal light and the LO light into two lights respectively, imparting 90 degrees of phase difference as a relative phase difference of lightwave to the LO light divided into the two lights, and then mixing the signal light being one of the divided lights with the LO light and mixing the signal light being the other of the divided lights with the LO light respectively.

Herein, as shown in FIG. 27, the slit 1261 is provided in an area A of the connection optical waveguide 1232 from the Y-branch waveguide 1251 to the 90-degree hybrid element 1241, and the ½ wavelength plate 1271 is inserted into the slit 1261. Herein, an optical axis of the ½ wavelength plate 1271 is adjusted to assume an angle of 45-degrees relative to a polarization axis of the connection optical waveguide 1232. Therefore, the polarization of the LO light passing through the ½ wavelength plate 1271 is rotated by 90 degrees and then inputted to the 90-degree hybrid element 1241.

Although the slit 1262 is provided in an area B of the connection optical waveguide 1234 from the Y-branch waveguide 1251 to the 90-degree hybrid element 1242, a ½ wavelength plate is not inserted into the slit 1262. Therefore, the LO light, of which polarization is without being changed, is inputted to the 90-degree hybrid element 1242.

Meanwhile, a reason is as follows for although the slit 1262 is provided on the connection optical waveguide 1234 but a ½ wavelength plate is not inserted into the slit 1262.

The slit 1261 is provided on the connection optical waveguide 1232 and the ½ wavelength plate 1271 is inserted into the connection optical waveguide 1232, a corresponding loss is produced. Therefore, unless otherwise configured, the LO light being inputted to the 90-degree hybrid element 1241 is subject to excessive loss than the LO light being inputted to the 90-degree hybrid element 1242 is. In order to compensate for loss as such, the slit 1262 is provided to the connection optical waveguide 1234.

For the above-described purpose, it is preferable that the slit width of the slit 1262 provided on the connection optical waveguide 1234 be designed so as to produce a loss corresponding to the loss produced by the slit 1261 and the ½ wavelength plate 1271 for connection optical waveguide 1232. Since a crossing point PD made of a crossing structure exists in the connection optical waveguide 1234, it is more preferable that the slit width of the slit 1262 be designed in consideration of a crossing loss at the crossing point PD.

The 90-degree hybrid element, the PBS, the directional coupler, the Y-branch element, and the MZI element according to the above-described embodiments may be applied to the 90-degree hybrid element, the PBS, the directional coupler, the Y-branch waveguide, and the MZI configuring the coherent mixer 1200.

The slit 1262 as a loss compensation portion may be replaced with other type of loss compensation portion producing a loss, such as one crossing structure or a plurality of crossing structures connected in series, and one tapered structure or a plurality of tapered structures connected in series.

In the above-described embodiment, the lower cladding layer was formed by using plasma CVD method and the upper cladding portion was formed by using FHD method. However, methods of forming the lower cladding layer and the upper cladding portion are not limited specifically. The lower cladding layer and the upper cladding portion can be formed by, for example, an arbitrarily selected one of methods among thermal oxidation, plasma CVD, sputtering, and FHD.

As described above, an optical waveguide element and a method of producing the optical waveguide element according to the present invention are suitable for use in a field of optical communications.

The present invention is not limited to the above described embodiment. The present invention includes a configuration appropriately combining the above-described elements.

Further effects or modification examples can be derived by an ordinary skilled person in the art easily. Therefore, further wide aspects of the present invention are not limited to the specific, detailed, and representative embodiment explained and described above. Accordingly, various modifications may be made without departing from the spirit or scope of the general inventive concept as defined by the appended claims and their equivalents.

The invention claimed is:

1. An optical waveguide element comprising:
    a cladding portion made of silica-based glass; and
    a plurality of optical waveguides positioned in the cladding portion and made of silica-based glass in which $ZrO_2$ crystal particles are dispersed, wherein
    the optical waveguide element is a planar lightwave circuit, and
    the plurality of optical waveguides configure an arrayed waveguide grating element, wherein the $ZrO_2$ crystal particles dispersed in the silica-based glass of the plurality of optical waveguides are dispersed to be separated by a distance equal to or smaller than a wavelength of a light input to the waveguide.

2. The optical waveguide element according to claim 1 wherein
    the plurality of optical waveguides includes an optical waveguide the one side of which is configured as a spot size converter.

3. The optical waveguide element according to claim 1 wherein the cladding portion does not include $ZrO_2$.

* * * * *